(12) United States Patent
Sugie

(10) Patent No.: US 12,261,563 B2
(45) Date of Patent: Mar. 25, 2025

(54) MOTOR DRIVER CIRCUIT FOR LINEAR MOTOR, POSITIONING DEVICE USING THE SAME, AND HARD DISK DEVICE

(71) Applicant: ROHM Co., LTD., Kyoto (JP)

(72) Inventor: Hisashi Sugie, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 359 days.

(21) Appl. No.: 18/045,216

(22) Filed: Oct. 10, 2022

(65) Prior Publication Data

US 2023/0113909 A1 Apr. 13, 2023

(30) Foreign Application Priority Data

Oct. 12, 2021 (JP) .................. 2021-167664

(51) Int. Cl.
*H02P 7/025* (2016.01)
*G11B 5/55* (2006.01)
*H02P 7/292* (2016.01)

(52) U.S. Cl.
CPC .............. *H02P 7/025* (2016.02); *H02P 7/292* (2013.01); *G11B 5/55* (2013.01)

(58) Field of Classification Search
CPC ............. H02P 7/025; H02P 7/292; G11B 5/55
See application file for complete search history.

(56) References Cited

U.S. PATENT DOCUMENTS

| 5,796,186 A * | 8/1998 | Nanba ..................... H02K 41/03 |
| | | 310/12.24 |
| 2017/0063273 A1* | 3/2017 | Murata ................... H02P 25/06 |

FOREIGN PATENT DOCUMENTS

JP 2019-161807 3/2021

* cited by examiner

*Primary Examiner* — Zoheb S Imtiaz
(74) *Attorney, Agent, or Firm* — CHIP LAW GROUP (57) ABSTRACT

Disclosed herein is a motor driver circuit including a logic circuit that generates a second code which changes linearly with a slope "a" with respect to a first code based on a position command for a linear motor to be driven and that can switch the slope "a," a D/A converter that converts the second code into an analog control signal, and a driver that drives the linear motor such that a current detection signal indicating a drive current of the linear motor approaches a target value that changes linearly with a slope "g" with respect to the control signal, the driver being configured to switch the slope "g." The motor driver circuit is switchable between a first state in which $g=g_1$ and $a=a_1$ and a second state in which $g=g_2$ (where $|g_2|>|g_1|$) and $a=a_2=a_1\times(g_1/g_2)$.

17 Claims, 10 Drawing Sheets

MOTOR DRIVER CIRCUIT FOR LINEAR MOTOR, POSITIONING DEVICE USING THE SAME, AND HARD DISK DEVICE

CROSS REFERENCE TO RELATED APPLICATIONS

This application claims priority benefit of Japanese Patent Application No. JP 2021-167664 filed in the Japan Patent Office on Oct. 12, 2021. Each of the above-referenced applications is hereby incorporated herein by reference in its entirety.

BACKGROUND

The present disclosure relates to a driver circuit for a linear motor.

Linear motors (linear actuators) for positioning target objects are used in various electronic devices and industrial machines. A voice coil motor is a type of linear motor and can control the position of a movable element according to a drive current supplied. A drive circuit of the voice coil motor performs feedback control such that the current flowing through the voice coil motor approaches a target current that defines a target position.

One example of the related art is disclosed in Japanese Patent Laid-Open No. 2019-161807.

SUMMARY

For example, a hard disk device uses a voice coil motor as a seek motor that positions a head. In a hard disk device, it is necessary to suppress noise during read and write on a hard disk.

In applications where a drive circuit needs to supply a wide range of drive current to a voice coil motor, a gain of current detection in a feedback loop needs to be set high. However, there is an issue that setting the gain high increases noise.

In view of the foregoing, it is desirable to provide a drive circuit for a linear motor that can suppress noise.

One aspect of the present disclosure relates to a motor driver circuit for a linear motor. The motor driver circuit includes a logic circuit that generates a second code that changes linearly with a slope "a" with respect to a first code based on a position command for the linear motor to be driven, the logic circuit being configured to switch the slope "a," a digital-to-analog (D/A) converter that converts the second code into an analog control signal, and a driver that drives the linear motor such that a current detection signal $V_{CS}$ indicating a drive current of the linear motor approaches a target value $V_{REF}$ that changes linearly with a slope "g" with respect to the control signal, the driver being configured to switch the slope "g." The motor driver circuit is switchable between a first state and a second state, in the first state, $g=g_1$ and $a=a_1$, and in the second state, $g=g_2$ (where $|g_2|>|g_1|$) and $a=a_2=a_1 \times (g_1/g_2)$.

Any combination of the above-described constituent components and any embodiment with the constituent components or the expressions replaced between a method, a device, and a system, for example, are also effective as the present disclosure or an aspect of the present disclosure. Moreover, the description in this item (brief summary) is by no means intended to describe all the indispensable features of the present disclosure. That is to say, any sub-combination of the features described above is also encompassed in the scope of the present disclosure.

According to an aspect of the present disclosure, noise can be suppressed.

DETAILED DESCRIPTION OF THE PREFERRED EMBODIMENTS

Overview of Embodiments

An overview of some exemplary embodiments of the present disclosure is described. This overview serves as the preamble of the following detailed description and is intended to simplify and describe some concepts of one or more embodiments for the purpose of basic understanding of the embodiments. It is noted that this overview is not intended to limit the scope of the disclosure. This overview is not a comprehensive overview of all the conceivable embodiments and is not intended to identify key elements of all the embodiments or delineate the scope of part or all of the aspects. For the sake of convenience, "one embodiment" may refer to one or more embodiments (embodiments and modifications) disclosed in the present specification.

A motor driver circuit according to one embodiment includes a logic circuit that generates a second code that changes linearly with a slope "a" with respect to a first code based on a position command for a linear motor to be driven, the logic circuit being configured to switch the slope "a," a D/A converter that converts the second code into an analog control signal, and a driver that drives the linear motor such that a current detection signal $V_{CS}$ indicating a drive current of the linear motor approaches a target value $V_{REF}$ that changes linearly with a slope "g" with respect to the control signal, the driver being configured to switch the slope "g," in which the motor driver circuit is switchable between a first state and a second state, in the first state, $g=g_1$ and $a=a_1$, and in the second state, $g=g_2$ (where $|g_2|>|g_1|$) and $a=a_2=a_1 \times (g_1/g_2)$.

The slope "g" of the driver is a gain of the motor driver circuit. By changing the gain "g" as well as the slope "a" of the logic circuit between the first state and the second state, it is possible to continuously change the linear motor with respect to the first code. The gain $g_2$ in the second state is relatively high. Therefore, a control range of the drive current of the linear motor can be extended. In the first state, the relatively low gain $g_1$ is selected. Therefore, noise can be suppressed. In other words, noise can be reduced in a certain current range while a wide current control range is secured.

In one embodiment, the motor driver circuit may further include a sample and hold circuit connected between the D/A converter and the driver. If the second code changes discontinuously when the slope "a" is changed, the control signal, which is the output of the D/A converter, may result in overshooting or undershooting, generating a glitch in the drive current. By inserting the sample and hold circuit and fixing an input into the driver while the control signal fluctuates, it is possible to suppress a glitch in the drive current.

When a value of the first code at a time of switching from the first state to the second state is $x_{TH}$, the logic circuit may gradually change the second code from a value when $a=a_1$ to a value when $a=a_2$. During the gradual change of the second code, the sample and hold circuit may supply the control signal sampled in the first state to the driver.

A glitch in the drive current can be suppressed by gradually changing the second code, keeping the control signal fixed by the sample and hold circuit during the gradual change, and switching the control signal to a correct voltage level at the same time as the gain switching after completion of the gradual change.

When a value of the first code at a time of switching from the second state to the first state is $x_{TH}$, the logic circuit may gradually change the second code from a value when $a=a_2$ to a value when $a=a_1$. The sample and hold circuit may sample the control signal before the gradual change starts, and supply the sampled control signal to the driver during the gradual change of the second code. With this configuration, a glitch in the drive current can be suppressed.

In one embodiment, the sample and hold circuit may include an input node connected to the D/A converter, an output node connected to the driver, a first switch connected between the input node and the output node, a capacitor having one end grounded, a second switch connected between another end of the capacitor and the input node, a buffer that receives a voltage at the another end of the capacitor, and a third switch connected between an output of the buffer and the output node. The sample and hold circuit may be switchable between a tracking state in which the first switch and the second switch are on and the third switch is off and a hold state in which the first switch and the second switch are off and the third switch is on.

In one embodiment, the sample and hold circuit may be further switchable to a through state in which the first switch is on and the second switch and the third switch are off.

In one embodiment, in a transition period between the first state and the second state, the sample and hold circuit may sample the control signal by transitioning from the tracking state to the through state. After the sample and hold circuit completes a sampling operation, the logic circuit may gradually change the second code. After completion of the gradual change of the second code, a gain of the driver may change and the sample and hold circuit may transition to the through state. The sample and hold circuit may subsequently transition to the tracking state.

In one embodiment, the driver may include a feedback circuit that generates a voltage command signal such that the current detection signal $V_{CS}$ approaches the target value $V_{REF}$, and an output stage that amplifies the voltage command signal and applies the amplified voltage command signal to the linear motor.

In one embodiment, the feedback circuit may include a current sense amplifier that generates a feedback signal that changes linearly with respect to the current detection signal $V_{CS}$ and that becomes a predetermined level $V_{CMREF}$ when $V_{CS}=0$.

In one embodiment, the motor driver circuit may further include a sense resistor disposed on a path of the drive current of the linear motor. The current sense amplifier may include a first operational amplifier, a first resistor connected between an inverting input of the first operational amplifier and one end of the sense resistor, a second resistor connected between the inverting input of the first operational amplifier and an output of the first operational amplifier, a third resistor connected between a non-inverting input of the first operational amplifier and another end of the sense resistor, and a fourth resistor having one end that receives the predetermined level $V_{CMREF}$ and another end connected to the non-inverting input of the first operational amplifier. The feedback signal may correspond to an output voltage of the first operational amplifier.

In one embodiment, the feedback circuit may further include an error amplifier that outputs the voltage command signal such that the feedback signal approaches a target level based on the control signal.

In one embodiment, the error amplifier may include a first input node that receives the feedback signal, a second input node that receives the control signal, a second operational amplifier having an inverting input, a non-inverting input that receives the predetermined level $V_{CMREF}$, and an output, a fifth resistor connected between the inverting input of the second operational amplifier and the first input node, and a sixth resistor connected between the inverting input of the second operational amplifier and the second input node. The voltage command signal may correspond to a voltage at the output of the second operational amplifier. The sixth resistor may be a variable resistor. The gain of the driver can be controlled according to a resistance value of the sixth resistor.

In one embodiment, the output stage may include a first amplifier that amplifies the voltage command signal without inversion, and a second amplifier that inverts and amplifies the voltage command signal.

In one embodiment, the linear motor may be a voice coil motor.

In one embodiment, the motor driver circuit may be integrated on a single semiconductor substrate. The term "integrated" herein may include a case where all the constituent components of a circuit are formed on a semiconductor substrate or a case where main constituent components of the circuit are integrated thereon, and some resistors and capacitors, for example, may be disposed outside the semiconductor substrate in order to adjust circuit constants. By integrating a circuit on a single chip, it is possible to reduce a circuit area and keep characteristics of circuit elements uniform.

A positioning device according to one embodiment includes a linear motor, and any of the above-described motor driver circuits that drives the linear motor.

A hard disk device according to one embodiment includes the positioning device described above.

EMBODIMENTS

Hereinafter, preferred embodiments are described with reference to the drawings. The same or equivalent constituent components, members, and processes illustrated in the drawings are denoted by the same reference signs, and redundant description is omitted as appropriate. The embodiments are described for exemplary purposes only and are by no means intended to limit the present disclosure. All the features and combinations described in the embodiments are not necessarily essential to the disclosure.

In the present specification, "the state in which a member A is connected to a member B" includes not only the state in which the member A and the member B are physically directly connected to each other but also the state in which the member A and the member B are indirectly connected to each other via another member that has no substantial effect on the electrical connection between them or that does not impair a function or an effect produced by the connection between them.

Similarly, "the state in which a member C is disposed between the member A and the member B" includes not only the state in which the member A and the member C or the member B and the member C are directly connected to each other but also the state in which the member A and the member C or the member B and the member C are indirectly connected to each other via another member that has no substantial effect on the electrical connection between them or that does not impair a function or an effect produced by the connection between them.

The vertical and horizontal axes of the waveform diagrams and time charts referred to in the present specification are enlarged or reduced as appropriate for ease of understanding, and each waveform illustrated therein is also simplified for ease of understanding.

Figure 1:
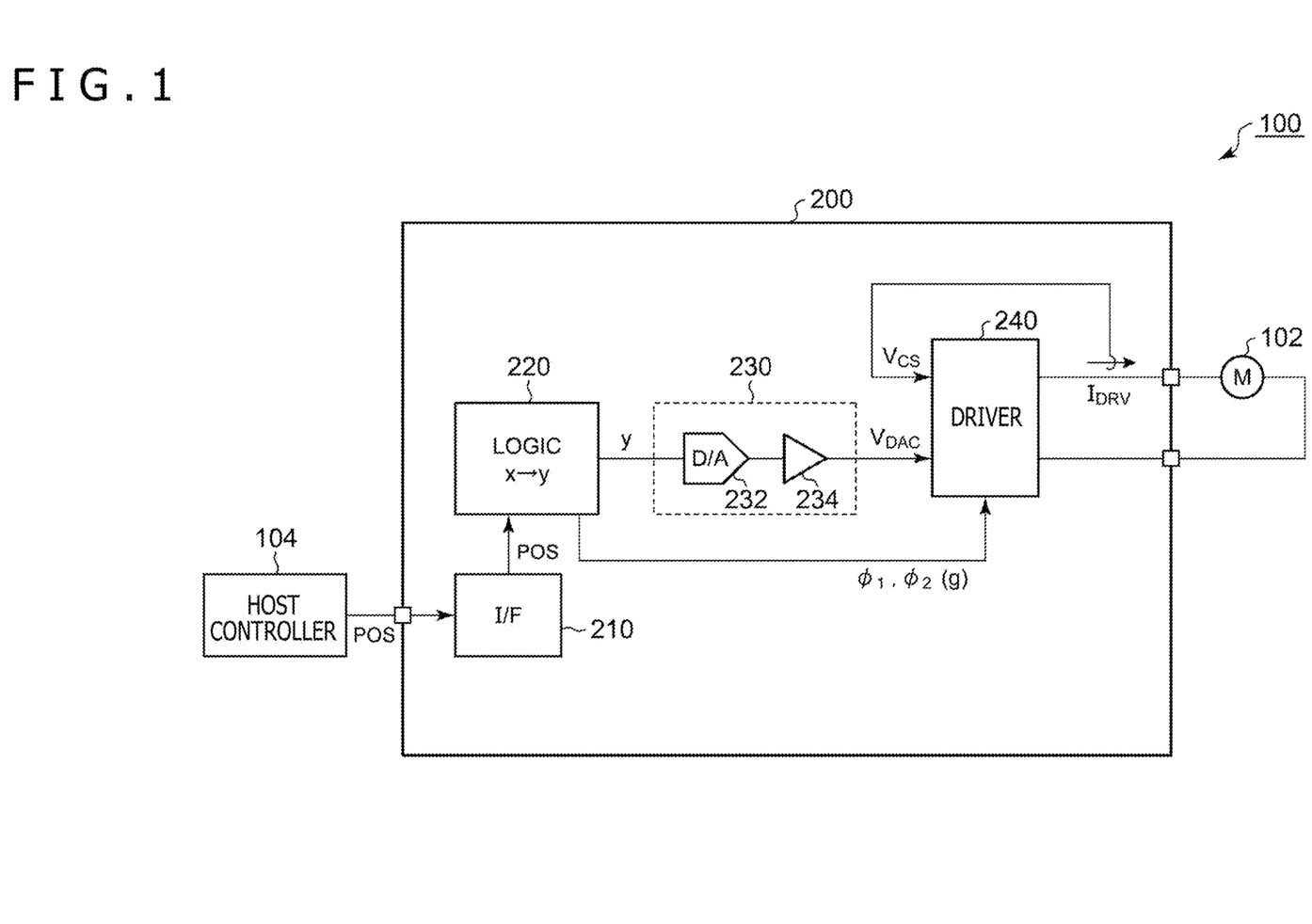
FIG. 1 is a block diagram of a positioning device including a motor driver circuit according to a first embodiment.

FIG. 1 is a block diagram of a positioning device 100, which includes a motor driver circuit 200 according to a first embodiment. The positioning device 100 includes a linear motor 102, a host controller 104, and the motor driver circuit 200.

The host controller 104 integrally controls the positioning device 100. The host controller 104 generates position control data POS, which indicates a target position of the linear motor 102, and transmits the position control data POS to the motor driver circuit 200. The host controller 104 includes, for example, a microcontroller, a field programmable gate array (FPGA), or an application specific integrated circuit (ASIC).

The motor driver circuit 200 receives the position control data POS and supplies a drive current $I_{DRV}$ with the amount corresponding to the position control data POS to the linear motor 102. The linear motor 102 is, for example, a voice coil motor, and its movable element is displaced by the amount corresponding to the drive current $I_{DRV}$ flowing through the linear motor 102.

A configuration of the motor driver circuit 200 is described next. The motor driver circuit 200 includes an interface circuit 210, a logic circuit 220, a D/A converter 230, and a driver 240. The motor driver circuit 200 is a functional integrated circuit (IC) integrated on a single semiconductor substrate.

The interface circuit 210 is connected to the host controller 104 and receives the position control data POS. The interface circuit 210 may be, for example, an inter IC ($I^2C$) interface or a serial peripheral interface (SPI).

The logic circuit 220 generates a first code x according to the position control data POS. For example, when the position control data POS is changed, the logic circuit 220 gradually changes the first code x from a value based on the position control data POS that has not yet been changed to a value based on the position control data POS that has been changed.

The logic circuit 220 generates a second code y that changes linearly with a slope "a" with respect to the first code x. The logic circuit 220 is capable of switching the slope "a" between at least two values $a_1$ and $a_2$. By generalization, the following equation is obtained.

$$y = ax + b \quad (1)$$

Note that "b" is a constant.

The D/A converter 230 converts the second code y into an analog control signal $V_{DAC}$. For example, the D/A converter 230 includes a converter 232 and a buffer (digital-to-analog converter (DAC) amplifier) 234. The input/output characteristics of the D/A converter 230 are expressed by the following equation.

$$V_{DAC} = K_{DAC} \cdot y \quad (2)$$

The driver 240 receives a current detection signal $V_{CS}$, which indicates the drive current $I_{DRV}$ of the linear motor 102, and the control signal $V_{DAC}$. The current detection signal $V_{CS}$ changes linearly with respect to the drive current $I_{DRV}$. For example, the current detection signal $V_{CS}$ is proportional to the drive current $I_{DRV}$, and the following relation holds.

$$V_{CS} = \alpha \cdot I_{DRV} \quad (3)$$

The driver 240 drives the linear motor 102 by feedback such that the current detection signal $V_{CS}$ approaches its target value $V_{REF}$. The target value $V_{REF}$ of the current detection signal $V_{CS}$ changes linearly with a slope "g" with respect to the control signal $V_{DAC}$. By generalization, the following relation holds between the target value $V_{REF}$ of the current detection signal $V_{CS}$ and the control signal $V_{DAC}$.

$$V_{REF} = g \times (V_{DAC} - V_0) \quad (4)$$

$V_0$ is a reference voltage $V_{REF}$ when the drive current $I_{DRV}$ is zero. $V_0$ is any constant including zero. Further, "g" may be positive or negative.

The slope "g" is a gain of the driver 240 and can be switched between at least two values $g_1$ and $g_2$. The gain "g" of the driver 240 is controlled by the logic circuit 220.

In other words, when the drive current $I_{DRV}$ is stabilized by feedback, $V_{CS} = V_{REF}$ holds. That is, since the equations (3) and (4) become equal to each other, the following equation (5) holds.

$$\alpha \cdot I_{DRV} = g \times (V_{DAC} - V_0) \quad (5)$$

Therefore, the drive current $I_{DRV}$ is expressed by the following equation (6) and changes linearly with respect to the control signal $V_{DAC}$.

$$I_{DRV} = g/\alpha \times (V_{DAC} - V_0) \quad (6)$$

For example, $V_0$ is determined such that $I_{DRV} = 0$ when the first code x is a center value $x_c$.

The motor driver circuit 200 is switchable between a first state $\varphi_1$ and a second state $\varphi_2$.

First State $\varphi_1$ $$g = g_1, \quad a = a_1$$

Second State $\varphi_2$ $$g = g_2 \text{ (where } |g_2| > |g_1|)$$

$$a = a_2 = a_1 \times (g_1/g_2)$$

That is, a product of "g" and "a" is the same between the first state $\varphi_1$ and the second state $\varphi_2$).

For example, the logic circuit 220 adaptively selects the first state $\varphi_1$ and the second state $\varphi_2$ depending on the value of the first code x. That is, when the first code x is within a predetermined range, the logic circuit 220 selects the first state $\varphi_1$. When the first code x is out of the predetermined range, the logic circuit 220 selects the second state $\varphi_2$. In other words, the logic circuit 220 automatically selects the first state $\varphi_1$ and the second state $\varphi_2$ without external control. Here, it is assumed that the predetermined range is $x_a$ to $x_b$. When $x_a < x < x_b$, the logic circuit 220 selects the first state $\varphi_1$. When $x < x_a$ or $x_b < x$, the logic circuit 220 selects the second state $\varphi_2$.

Figure 2:
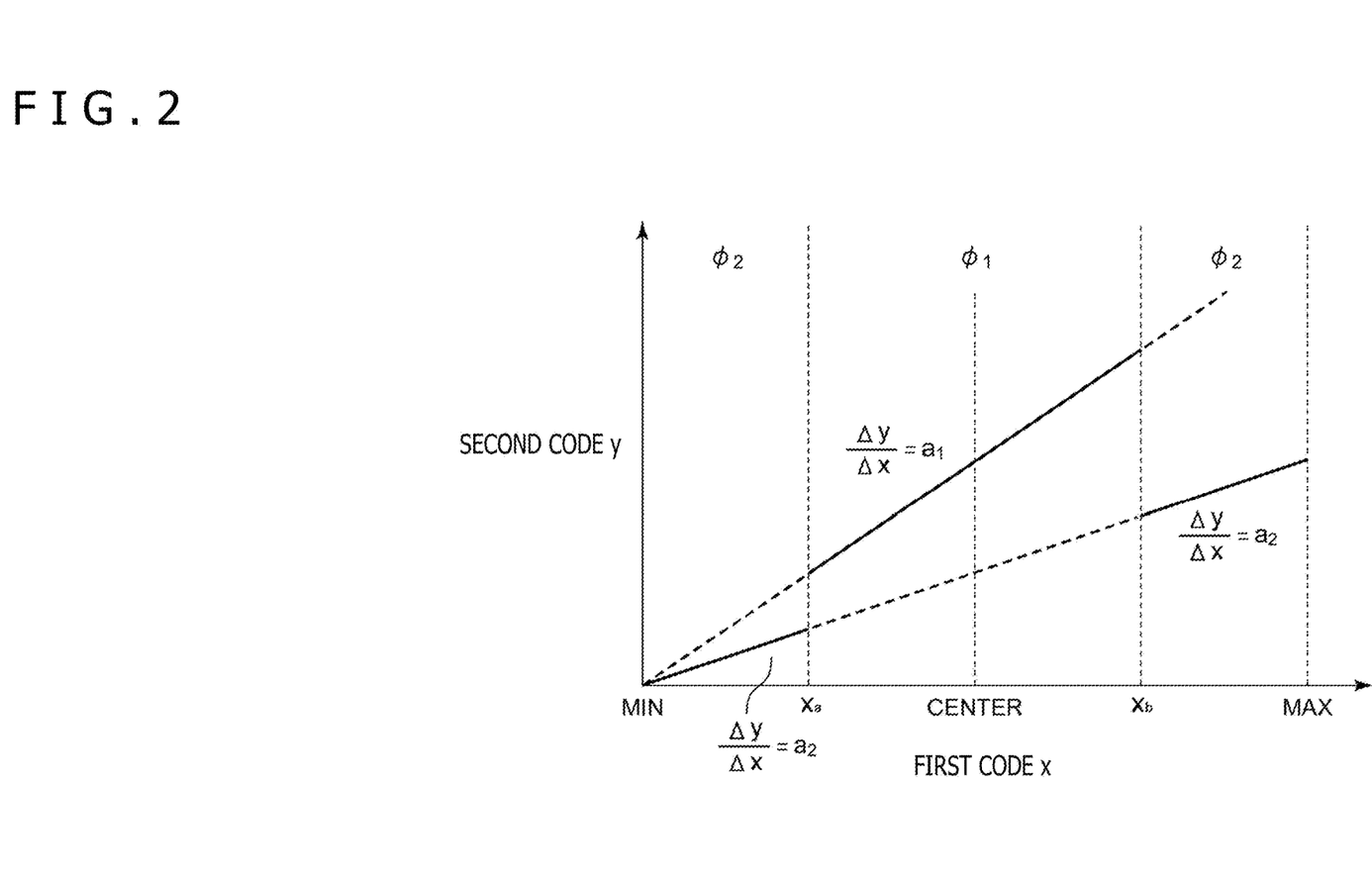
FIG. 2 is a diagram illustrating a relation between a first code x and a second code y in a first state and a second state.

FIG. 2 is a diagram illustrating the relation between the first code x and the second code y in the first state $\varphi_1$ and the second state $\varphi_2$. In the first state $\varphi_1$ where $x_a < x < x_b$, the slope of the second code y is $\Delta y/\Delta x = a_1$. In the second state $\varphi_2$ where $x < x_a$ or $x_b < x$, the slope of the second code y is $\Delta y/\Delta x = a_2$.

The configuration of the motor driver circuit 200 is as described above. An operation of the motor driver circuit 200 is described next.

First State $\varphi_1$

In the first state $\varphi_1$, the following relation holds.

$$y = a_1 x \tag{1a}$$

Further, the control signal $V_{DAC}$ is as follows.

$$V_{DAC} = K_{DAC} \cdot a_1 x \tag{2a}$$

Substituting this into the equation (6) together with $g = g_1$ obtains the following equation (6a).

$$I_{DRV} = g/\alpha \times (V_{DAC} - V_0) = g_1/\alpha \times (K_{DAC} \cdot a_1 x - V_0) \tag{6a}$$

This is the input/output characteristics of the motor driver circuit 200 in the first state $\varphi_1$. The drive current $I_{DRV}$ changes linearly with respect to the first code x, and its slope $\Delta I_{DRV}/\Delta x$ is as follows.

$$\Delta I_{DRV}/\Delta x = g_1/\alpha \times K_{DAC} \cdot p \tag{7a}$$

Second State $\varphi_2$

In the second state $\varphi_2$, the following relation holds.

$$y = a_2 x \tag{1b}$$

Further, the control signal $V_{DAC}$ is as follows.

$$V_{DAC} = K_{DAC} \cdot a_2 x \tag{2b}$$

Substituting this into the equation (6) together with $g = g_2$ obtains the following equation (6b).

$$I_{DRV} = g/\alpha \times (V_{DAC} - V_0) = g_2/\alpha \times (K_{DAC} \cdot a_2 x - V_0) \tag{6b}$$

This is the input/output characteristics of the motor driver circuit 200 in the second state $\varphi_2$. The drive current $I_{DRV}$ changes linearly with respect to the first code x, and its slope $\Delta I_{DRV}/\Delta x$ is as follows.

$$\Delta I_{DRV}/\Delta_x = g_2/\alpha \times K_{DAC} \cdot a_2 \tag{7b}$$

As described above, the following relation holds.

$$a_2 = a_1 \times (g_1/g_2)$$

Substituting this into the equation (7b) obtains the following equation (7b').

$$\Delta I_{DRV}/\Delta x = g_2/g_2 \times K_{DAC} \cdot a_1 \times (g_1/g_2) = g_1/\alpha \times K_{DAC} \cdot a_1 \tag{7b'}$$

This matches the equation (7a) of the slope in the first state $^{SM}_1$.

Figure 3:
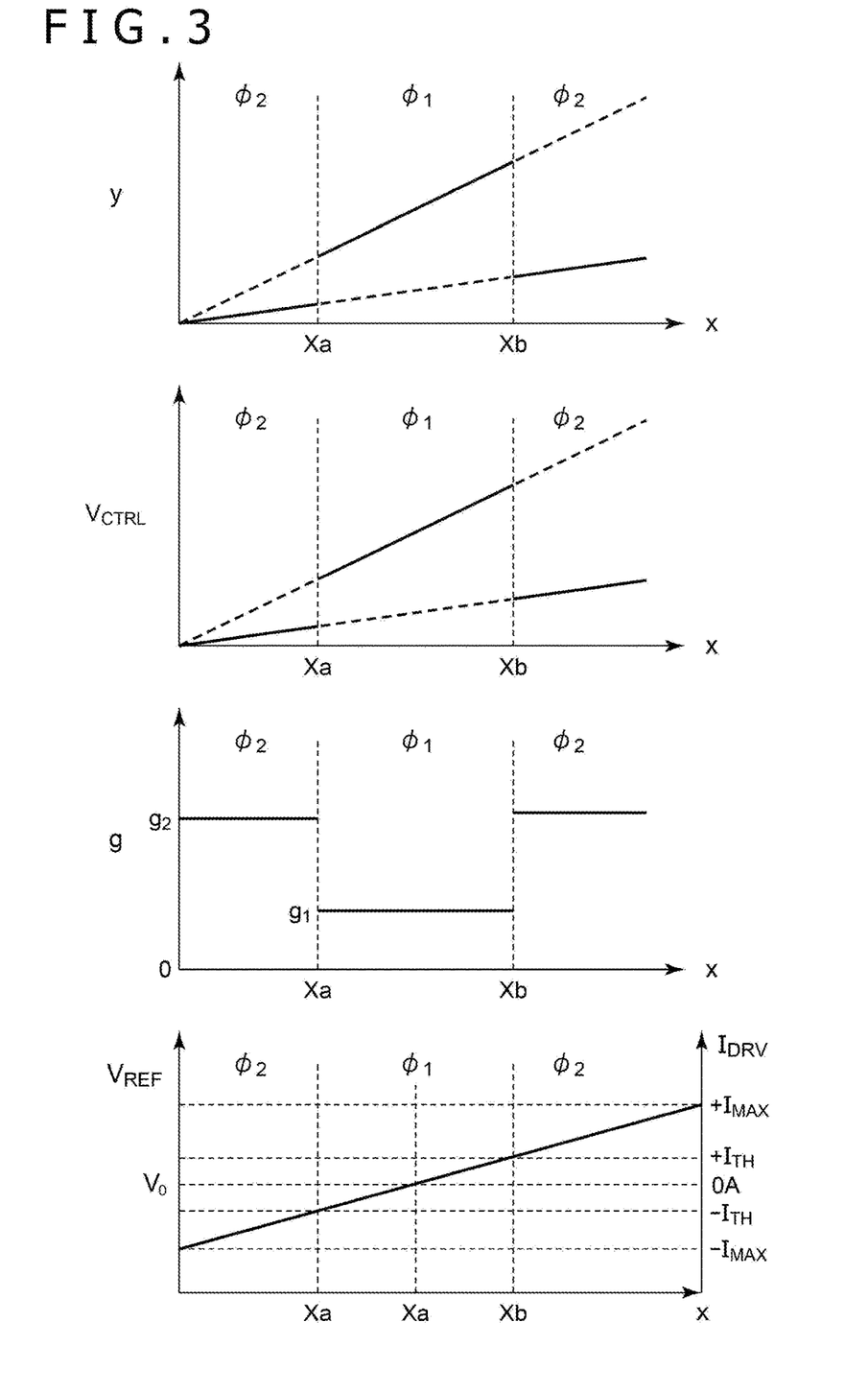
FIG. 3 is a diagram illustrating input/output characteristics of the motor driver circuit of FIG. 1.

FIG. 3 is a diagram illustrating the input/output characteristics of the motor driver circuit 200 of FIG. 1. Here, it is assumed that "g" is positive and $V_0$ is positive in the driver 240. The gain "g" is switched between the first state $\varphi_1$ and the second state $\varphi_2$. Moreover, the slope "a" of the logic circuit 220 is switched such that the product with the gain "g" is constant. With this configuration, the relation between the first code x and the drive current $I_{DRV}$ can be the same between the first state $\varphi_1$ and the second state $\varphi_2$. In other words, from the viewpoint of the host controller 104, the input/output characteristics of the motor driver circuit 200 are the same.

In the first state $\varphi_1$, the low value $g_1$ is selected as the gain "g" of the driver 240. Therefore, noise generated by the driver 240 can be suppressed. Specifically, in the range $-I^{TH}$ to $+I^{TH}$ of the drive current $I_{DRV}$ that corresponds to the range $x_a$ to $x_b$ of the first code, the low gain $g_1$ is selected and noise is suppressed.

The advantages of the motor driver circuit 200 become clear by contrast with a comparative technology.

Figure 4:
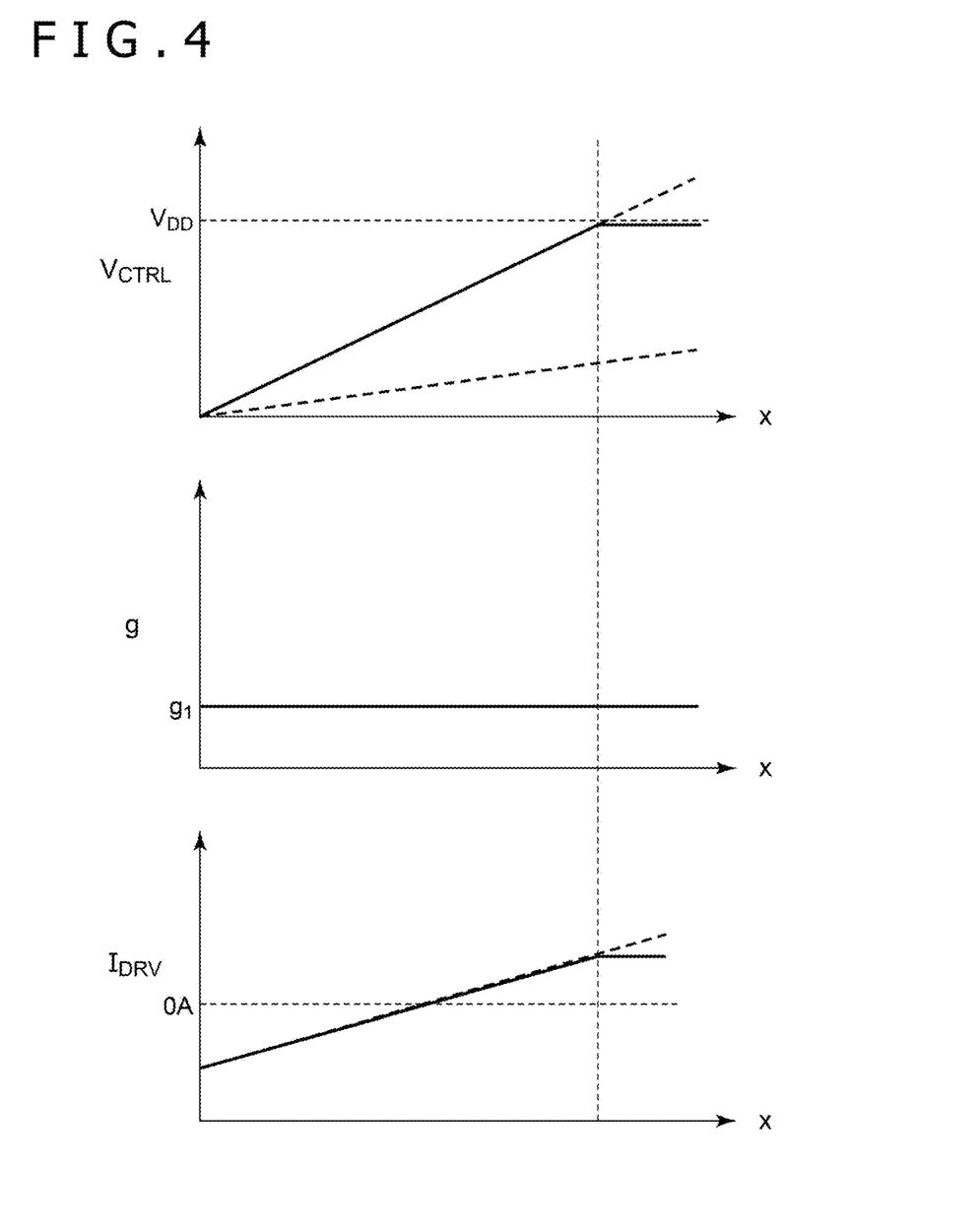
FIG. 4 is a diagram for describing an operation of a motor driver circuit according to a comparative technology.

FIG. 4 is a diagram for describing an operation of a motor driver circuit according to a comparative technology. With the comparative technology, the low gain $g_1$ is set in the entire range, and noise generated by the driver 240 can be kept small.

Here, when the gain $g_1$ of the driver 240 is low and it is desired to generate a large drive current $I_{DRV}$, in other words, when it is desired to extend a motion range of the linear motor 102, a voltage level of the control signal $V_{DAC}$ needs to be increased. However, a voltage range that any signal can take in an analog circuit is restricted by a power supply voltage $V_{DD}$. Therefore, since the control signal $V_{DAC}$ is clamped in a region where the first code x is large, the range of the drive current $I_{DRV}$ is narrower than that of the case where the gain "g" is large.

On the other hand, in the present embodiment, the gain $g_2$ is high in the second state $\varphi_2$. Accordingly, a maximum value $I_{MAX}$ of the drive current $I_{DRV}$ of the linear motor 102 can be increased, and a control range of the drive current $I_{DRV}$ can be extended. In the first state $\varphi_1$, noise can be suppressed by selecting the relatively low gain $g_1$. In other words, while a wide current control range is secured, noise can be reduced in a certain current range.

Figure 5:
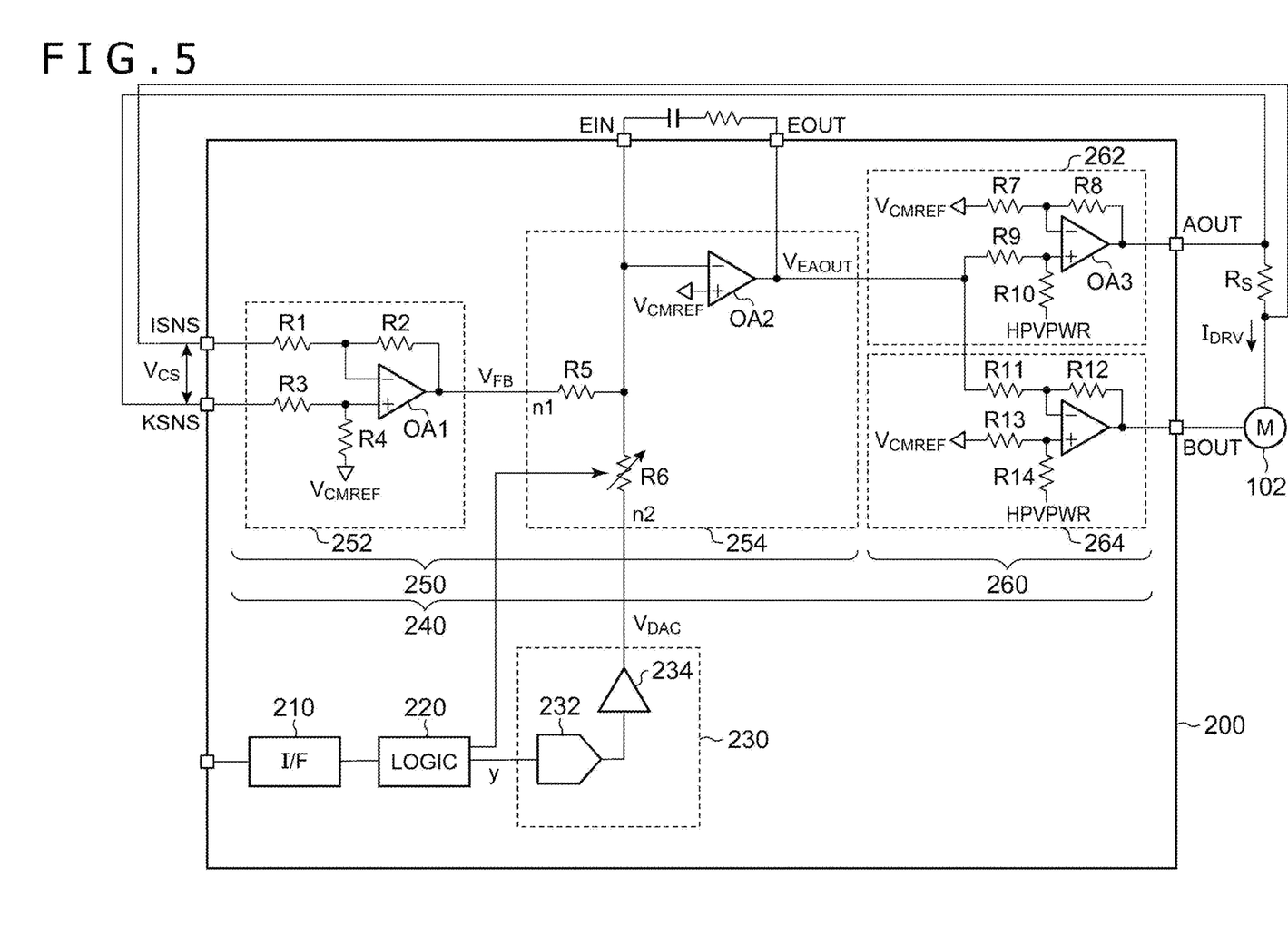
FIG. 5 is a circuit diagram illustrating an example of a specific configuration of the motor driver circuit.

Next, an example of a specific configuration of the motor driver circuit 200 is described. FIG. 5 is a circuit diagram illustrating an example of a specific configuration of the motor driver circuit 200.

The linear motor 102 and a current sense resistor $R_S$ are connected in series between output pins AOUT and BOUT of the motor driver circuit 200. A voltage drop proportional to the drive current $I_{DRV}$ occurs across the current sense resistor $R_S$. The voltage drop across the current sense resistor $R_S$ is fed back as the current detection signal $V_{CS}$ between current sense pins ISNS and KSNS of the motor driver circuit 200.

$$V_{CS} = R_S \times I_{DRV} \tag{8}$$

The driver 240 includes a feedback circuit 250 and an output stage 260. The feedback circuit 250 generates a voltage command signal $V_{EAOUT}$ such that the current detection signal $V_{CS}$ approaches the target value $V_{REF}$. The output stage 260 amplifies the voltage command signal $V_{EAOUT}$ and applies the amplified voltage command signal $V_{EAOUT}$ to the linear motor 102.

The feedback circuit 250 includes a current sense amplifier 252 and an error amplifier 254.

The current sense amplifier 252 generates a feedback signal $V_{FB}$, which changes linearly with respect to the current detection signal $V_{CS}$ and which becomes a predetermined level $V_{CMREF}$ when $V_{CS} = 0$ (i.e., $I_{DRV} = 0$).

The current sense amplifier 252 includes a first operational amplifier OA1, a first resistor R1, a second resistor R2, a third resistor R3, and a fourth resistor R4.

The first resistor R1 is connected between an inverting input (−) of the first operational amplifier OA1 and one end (ISNS pin) of the sense resistor $R_S$. The second resistor R2 is connected between the inverting input (−) of the first operational amplifier OA1 and an output of the first operational amplifier OA1. The third resistor R3 is connected between a non-inverting input (+) of the first operational amplifier OA1 and another end (KSNS pin) of the sense resistor $R_S$. One end of the fourth resistor R4 receives a voltage $V_{CMREF}$ of a predetermined level while another end of the fourth resistor R4 is connected to the non-inverting input (+) of the first operational amplifier OA1. The feedback signal $V_{FB}$ corresponds to an output voltage of the first operational amplifier OA1.

When R1=R3 and R2=R4 hold, the following equation (9) holds.

$$V_{FB}=R2/R1 \times V_{CS}+V_{CMREF} \quad (9)$$

The error amplifier 254 outputs the voltage command signal $V_{EAOUT}$ such that the feedback signal $V_{FB}$ approaches a target level based on the control signal $V_{DAC}$.

The error amplifier 254 includes a first input node n1, a second input node n2, a second operational amplifier OA2, a fifth resistor R5, and a sixth resistor R6. The feedback signal $V_{FB}$ is input into the first input node n1. The control signal $V_{DAC}$ is input into the second input node n2. The non-inverting input (+) of the second operational amplifier OA2 receives the reference voltage $V_{CMREF}$. A capacitor and resistor for phase compensation are connected between an inverting input (−, EIN pin) and an output (EOUT pin) of the second operational amplifier OA2.

The fifth resistor R5 is connected between an inverting input (−) of the second operational amplifier OA2 and the first input node n1. The sixth resistor R6 is connected between the inverting input (−) of the second operational amplifier OA2 and the second input node n2. The voltage command signal $V_{EAOUT}$ may correspond to the voltage at the output of the second operational amplifier OA2.

The inverting input (−) of the error amplifier 254 is as follows.

$$(R6 \cdot V_{FB}+R_5 \cdot V_{DAC})/(R5+R6)$$

Further, virtual grounding is made in a steady state. Therefore, the inverting input (−) of the error amplifier 254 becomes equal to the common voltage $V_{CMREF}$ of the non-inverting input (+) and the following equation (10) is obtained.

$$(R6 \cdot V_{FB}+R5 \cdot V_{DAC})/(R5+R6)=V_{CMREF} \quad (10)$$

Therefore, in the steady state, the following equation (11) holds.

$$V_{FB}=-R5/R6 \cdot V_{DAC}+(R5/R6+1) \cdot V_{CMREF} \quad (11)$$

Substituting the equation (9) into the equation (11) obtains the following.

$$R2/R1 \times V_{CS}+V_{CMREF}=-R5/R6 \cdot V_{DAC}+(R5/R6+1) \cdot V_{CMREF}$$

Transforming this obtains the following equation (12).

$$V_{CS}=-(R5/R6)(R1/R2) \cdot V_{DAC}+(R5/R6)-V_{CMREF}=-(R5/R6)(R1/R2)\{V_{DAC}-(R1/R2)^{-1} \cdot V_{CMREF}\} \quad (12)$$

Since $V_{REF}$ in the equation (4) gives a target value of $V_{CS}$, they are equal to each other in the steady state and therefore, the equation (12) and the equation (4) are equal to each other. Contrasting the equation (12) with the equation (4) obtains the following.

$$g=-(R5/R6)(R1/R2)$$

$$V_0=(R1/R2)^{-1} V_{CMREF}$$

When R1=R2, the following equations are obtained.

$$g=-(R5/R6)$$

$$V_0=V_{CMREF}$$

In FIG. 5, the sixth resistor R6 includes a variable resistor. The gain "g" of the driver 240 can be controlled depending on a resistance value of the sixth resistor R6. In the first state $\varphi_1$, the logic circuit 220 sets the resistance value of the sixth resistor R6 to a relatively high value R6_1. In the second state $\varphi_2$, the logic circuit 220 sets the resistance value of the sixth resistor R6 to a relatively low value R6_2.

The resistance values R6_1 and R6_2 only need to be respectively determined to be as follows.

$$R6\_1=R5/|g_1|$$

$$R6\_2=R5/|g_2|$$

The output stage 260 includes a first amplifier 262 and a second amplifier 264. The first amplifier 262 amplifies the voltage command signal $V_{EAOUT}$ without inversion. The second amplifier 264 inverts and amplifies the voltage command signal $V_{EAOUT}$.

The first amplifier 262 includes a third operational amplifier OA3 and a seventh resistor R7 to a tenth resistor R10. A configuration of the first amplifier 262 is similar to that of the current sense amplifier 252. When R7=R9 and R8=R10 hold, an output voltage $V_{AOUT}$ of the first amplifier 262 can be expressed by the following equation (13).

$$V_{AOUT}=R8/R7 \times (V_{EAOUT}-V_{CMREF})+HVPWR \quad (13)$$

The second amplifier 264 includes a fourth operational amplifier OA4 and an eleventh resistor R11 to a fourteenth resistor R14. A configuration of the second amplifier 264 is similar to those of the current sense amplifier 252 and the first amplifier 262. When R11=R13 and R12=R14 hold, an output voltage $V_{BOUT}$ of the second amplifier 264 is expressed by the following equation (14).

$$V_{BOUT}=-R12/R11 \times (V_{EAOUT}-V_{CMREF})+HVPWR \quad (14)$$

Note that R8/R7=R12/R11 is satisfied.

The configuration of the motor driver circuit 200 is as described above. The motor driver circuit 200 can suppress noise by reducing the gain "g" of the driver 240 in the first state $\varphi_1$ while extending the control range of the drive current $I_{DRV}$ by increasing the gain "g" of the driver 240 in the second state $\varphi_2$.

Second Embodiment

Figure 6:
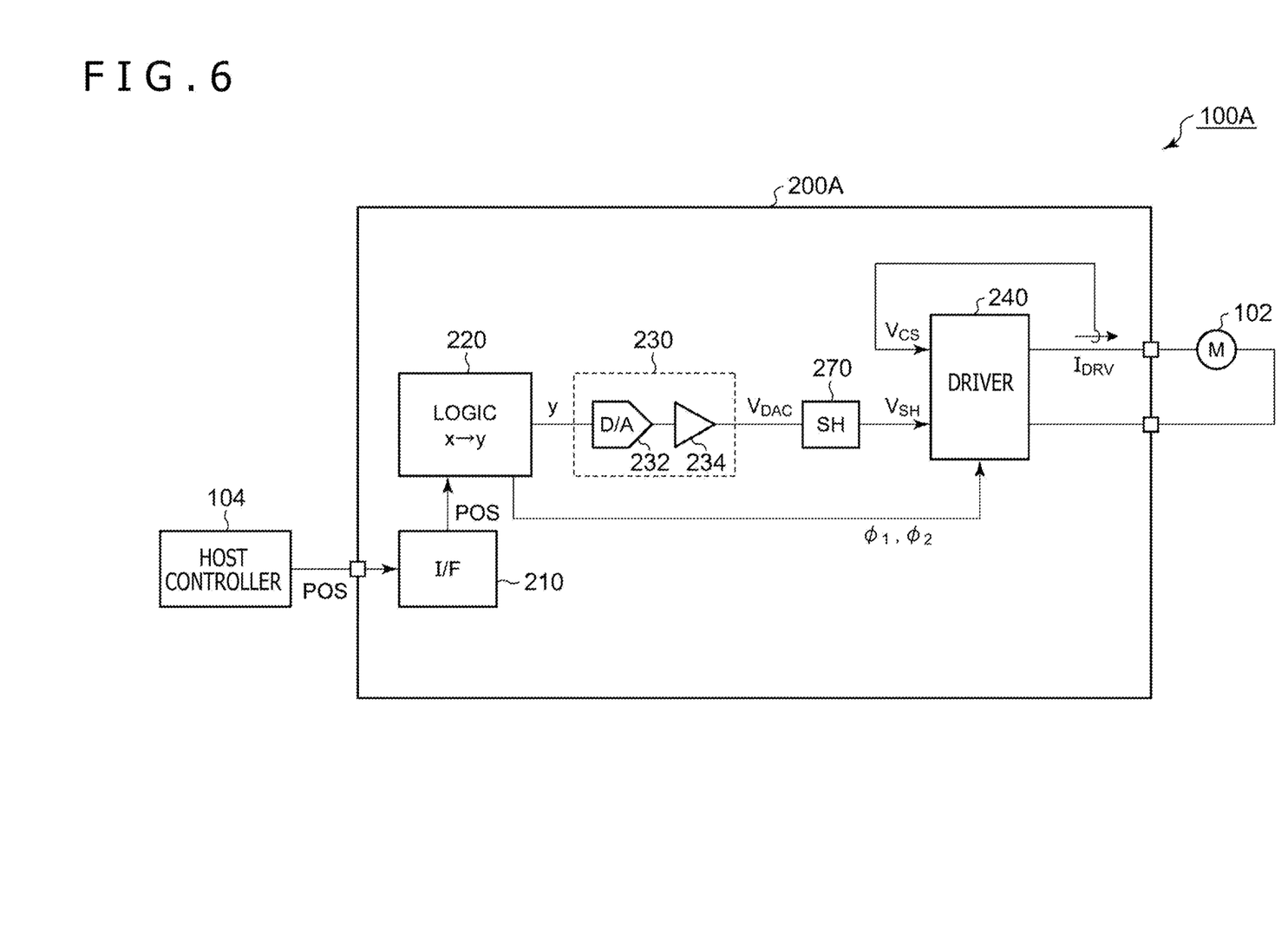
FIG. 6 is a block diagram of a positioning device including a motor driver circuit according to a second embodiment.

FIG. 6 is a block diagram of a positioning device 100A, which includes a motor driver circuit 200A according to a second embodiment. The following focuses on the differences between the first embodiment and the second embodiment.

The motor driver circuit 200A includes a sample and hold circuit 270 in addition to the motor driver circuit 200 of FIG. 1.

The sample and hold circuit 270 is connected between the D/A converter 230 and the driver 240. In a tracking state (through state), the sample and hold circuit 270 outputs the control signal $V_{DAC}$ as it is and samples the control signal $V_{DAC}$ through a sampling operation. In a hold state, the sample and hold circuit 270 outputs the sampled control signal $V_{DAC\_SH}$. When the output of the sample and hold circuit 270 is described as $V_{SH}$, $V_{SH}=V_{DAC}$ holds in the tracking state and during the sampling operation and $V_{SH}=V_{DAC\_SH}$ holds in the hold state.

The logic circuit 220 switches from the first state $\varphi_1$ to the second state $\varphi_2$ when the first code x exceeds a predetermined value $x_{TH}$. $x_{TH}$ corresponds to $x_a$ and $x_b$.

In the first state $\varphi_1$ and the second state $\varphi_2$, the sample and hold circuit 270 enters the tracking state in which $V_{SH}=V_{DAC}$. That is, the motor driver circuit 200A in the first state $\varphi_1$ and the second state $\varphi_2$ is equivalent to the motor driver circuit 200 of FIG. 1.

The configuration of the motor driver circuit 200A is as described above.

In order to clarify the advantages of the motor driver circuit 200A, an issue that may arise in the motor driver circuit 200 of FIG. 1 is described below.

In the motor driver circuit 200 of FIG. 1, the D/A converter 230 includes the converter 232 and the buffer 234. If the response speed of the buffer 234 is slow when the second code y generated by the logic circuit 220 changes discontinuously at the time of switching between the first state $\varphi_1$ and the second state $\varphi_2$, there is a possibility that overshooting, undershooting, or ringing occurs in the control signal $V_{DAC}$, which is the output of the buffer 234. Overshooting, undershooting, or ringing of the control signal $V_{DAC}$ appears as a glitch in the drive current $I_{DRV}$.

Based on the issue described above, an operation of the motor driver circuit 200A is described below.

Figure 7:
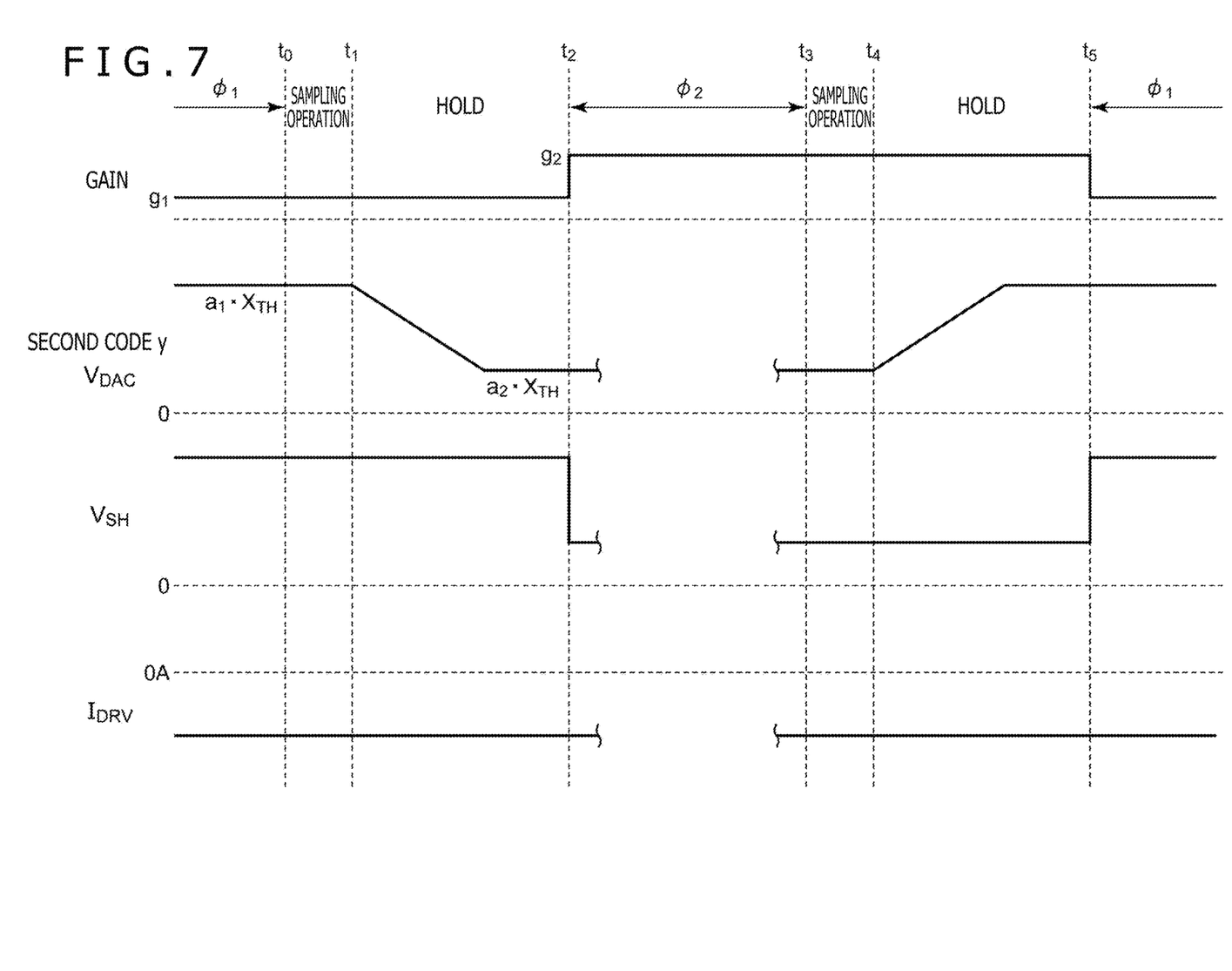
FIG. 7 is a time chart for describing an operation of the motor driver circuit of FIG. 6.

FIG. 7 is a time chart for describing the operation of the motor driver circuit 200A of FIG. 6. When the first code x becomes the predetermined value $x_{TH}$, the logic circuit 220 generates a trigger for transition from the first state $\varphi_1$ to the second state $\varphi_2$.

Before time to, the motor driver circuit 200A is in an initial state. The motor driver circuit 200A operates in the first state $\varphi 1$. In other words, the gain of the driver 240 is $g_1$, and the slope of the logic circuit 220 is $a_1$. The second code y takes $y=a_1 \cdot x_{TH}$. Note that b=0. At the time of transition from the first state $\varphi_1$ to the second state $\varphi_2$, the logic circuit 220 gradually changes the second code y from $a_1 \cdot x_{TH}$ to $a_2 \cdot x_{TH}$ (time $t_1$ to $t_2$).

The sample and hold circuit 270 samples the control signal $V_{DAC}$ corresponding to $y=a_1 \cdot x_{TH}$ prior to this gradual change period $t_1$ to $t_2$, and holds the sampled control signal $V_{DAC}$ during the gradual change period $t_1$ to $t_2$.

At time $t_2$ when the gradual change period ends, the sample and hold circuit 270 is switched from the hold state to the tracking state, and at the same time, the gain of the driver 240 is switched from $g_1$ to $g_2$.

The transition from the first state $\varphi_1$ to the second state $\varphi_2$ is as described above. The transition from the second state $\varphi_2$ to the first state $\varphi_1$ is described next.

During the period from time $t_2$ to time $t_3$, the motor driver circuit 200A continues to operate in the second state $\varphi_2$. During this period, the first code x takes a value corresponding to the position control data POS, and the drive current $I_{DRV}$ also changes.

At time $t_3$, when the first code x becomes the predetermined value $X_{TH}$, the logic circuit 220 generates a trigger for transition from the second state $\varphi_2$ to the first state $\varphi_1$.

During the transition from the second state $\varphi_2$ to the first state $\varphi_1$, the logic circuit 220 gradually changes the second code y from $a_2 \cdot x_{TH}$ to $a_1 \cdot x_{TH}$ (time $t_4$ to time $t_5$).

The sample and hold circuit 270 samples the control signal $V_{DAC}$ corresponding to $y=a_2 \cdot x_{TH}$ prior to this gradual change period time $t_4$ to $t_5$, and holds the sampled control signal $V_{DAC}$ during the gradual change period time $t_4$ to $t_5$.

At time $t_5$ when the gradual change period ends, the sample and hold circuit 270 is switched from the hold state to the tracking state, and at the same time, the gain of the driver 240 is switched from $g_2$ to $g_1$.

The transition from the second state $\varphi_2$ to the first state $\varphi_1$ is as described above.

The motor driver circuit 200A can suppress a glitch in the drive current $I_{DRV}$ at the time of switching from the first state $\varphi_1$ to the second state $\varphi_2$ and from the second state $\varphi_2$ to the first state $\varphi_1$.

Figure 8:
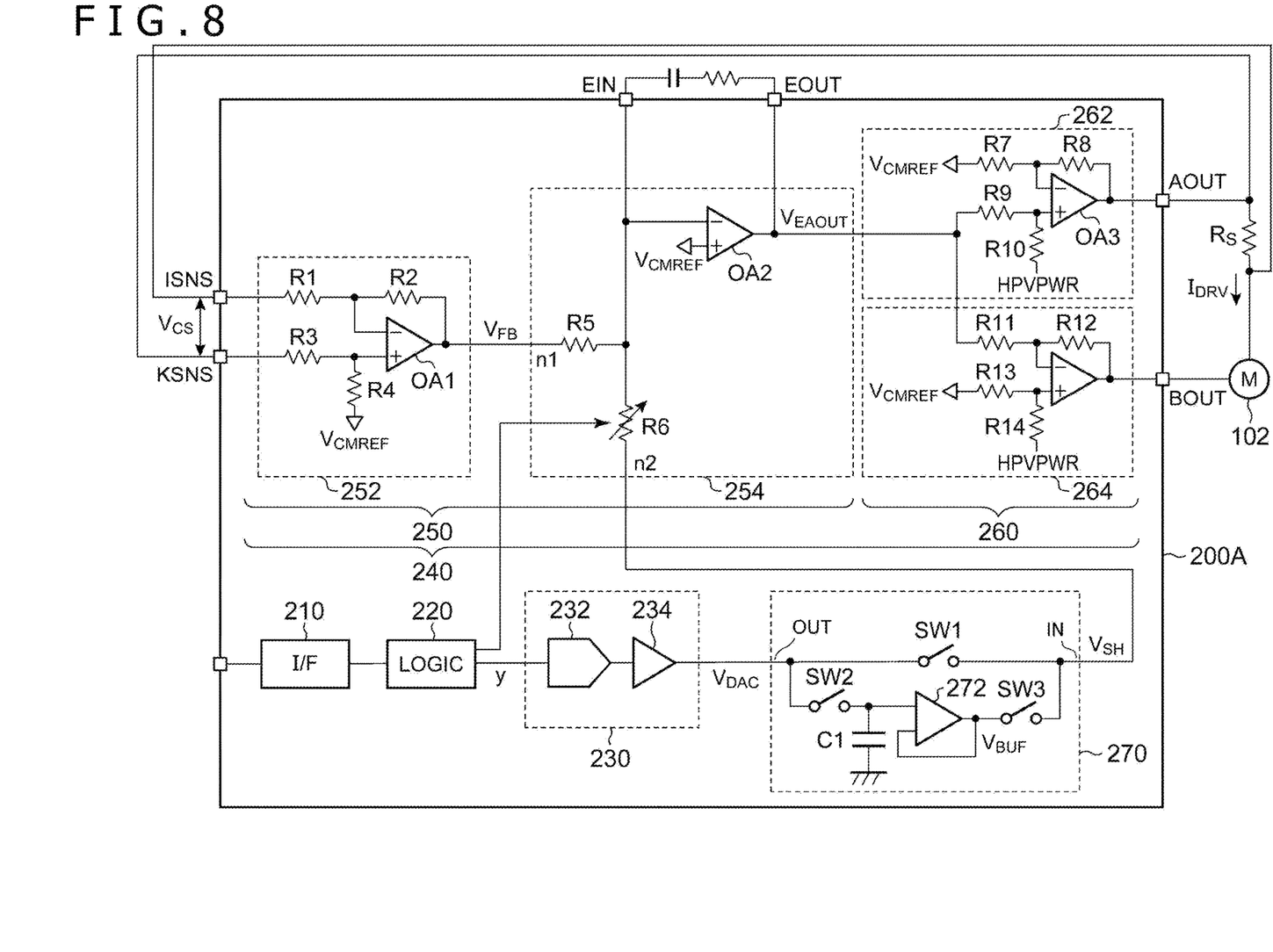
FIG. 8 is a circuit diagram illustrating an example of a specific configuration of the motor driver circuit.

FIG. 8 is a circuit diagram illustrating an example of a specific configuration of the motor driver circuit 200A. The configuration of the motor driver circuit 200A other than the sample and hold circuit 270 is similar to that of the motor driver circuit 200 illustrated in FIG. 5.

The sample and hold circuit 270 includes a capacitor C1, a buffer 272, and a first switch SW1 to a third switch SW3. An input node IN of the sample and hold circuit 270 is connected to an output of the D/A converter 230, while an output node OUT of the sample and hold circuit 270 is connected to the driver 240. The first switch SW1 is connected between the input node IN and the output node OUT. One end of the capacitor C1 is grounded. The second switch SW2 is connected between the other end of the capacitor C1 and the input node IN. The buffer 272 receives a voltage at the other end of the capacitor C1. The third switch SW3 is connected between an output of the buffer 272 and the output node OUT.

The sample and hold circuit 270 is switchable between the following three states.

Tracking state
  First switch SW1: ON
  Second switch SW2: ON
  Third switch SW3: OFF
Hold state
  First switch SW1: OFF
  Second switch SW2: OFF
  Third switch SW3: ON
Through state
  First switch SW1: ON
  Second switch SW2: OFF
  Third switch SW3: OFF The logic circuit 220 switches ON and OFF of the first switch SW1 to the third switch SW3, thereby controlling the state of the sample and hold circuit 270.

Next, an operation of the motor driver circuit 200A of FIG. 8 is described.

Figure 9:
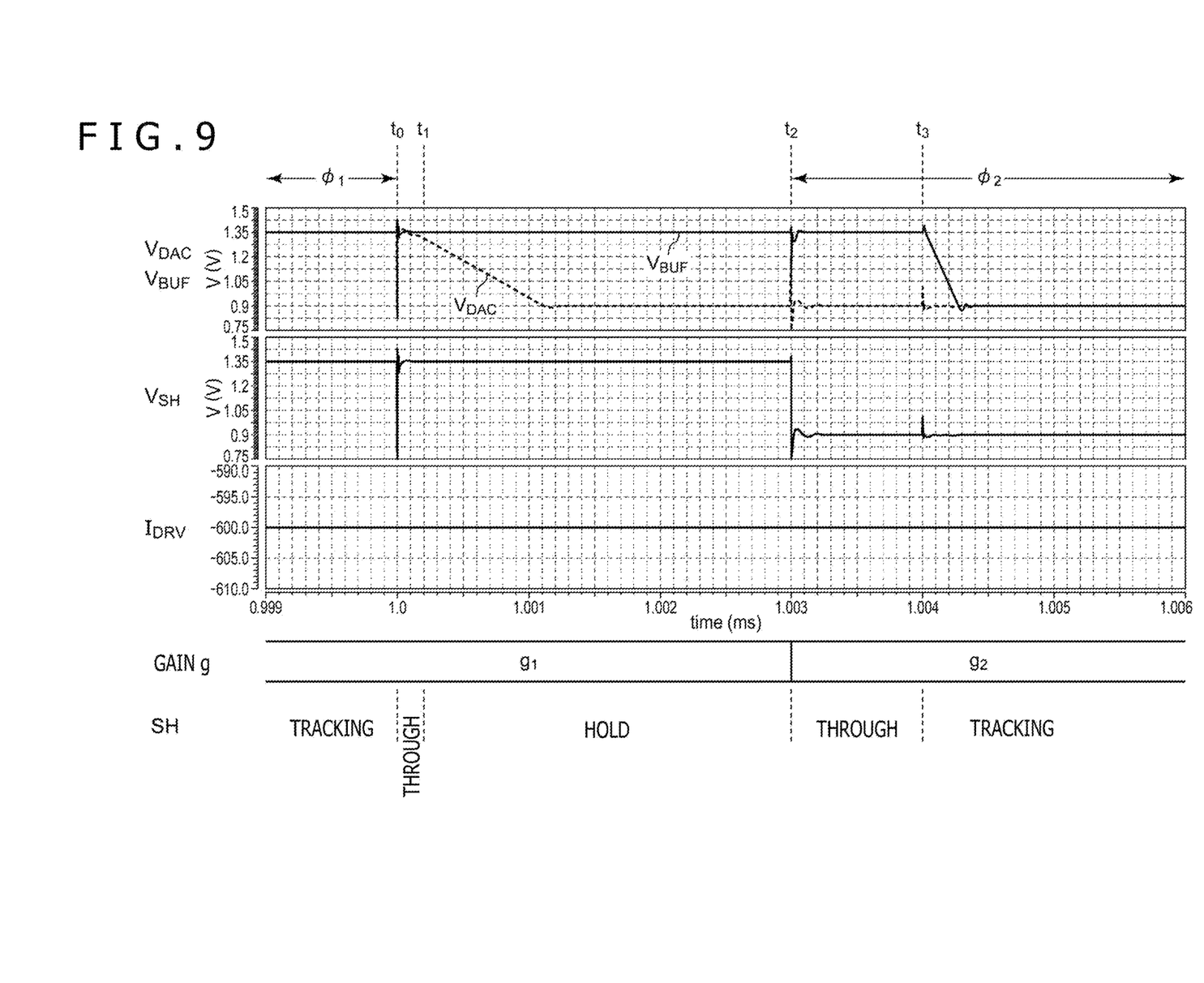
FIG. 9 is a diagram for describing an operation of the motor driver circuit of FIG. 8.

FIG. 9 is a diagram for describing the operation of the motor driver circuit 200A of FIG. 8. In FIG. 9, the control signal $V_{DAC}$, an output voltage $V_{BUF}$ of the buffer 272, an output voltage $V_{SH}$ of the sample and hold circuit 270, the drive current $I_{DRV}$, the gain "g" of the driver 240, and the state of the sample and hold circuit 270 are illustrated.

Before time $t_0$, the motor driver circuit 200A is in the first state $\varphi_1$. As in the situation of FIG. 7, when $x=X_{TH}$, a trigger for transition from the first state $\varphi_1$ to the second state $\varphi_2$ is generated at time $t_0$. The time $t_0$ to $t_2$ is a transition period.

At time t0, the sample and hold circuit 270 transitions from the tracking state to the through state. Accordingly, the sample and hold circuit 270 samples the control signal $V_{DAC}$. After that, the sample and hold circuit 270 transitions to the hold state and outputs the sampled control signal $V_{DAC}$.

After completion of the sampling operation of the sample and hold circuit 270 at time $t_1$, the logic circuit 220 gradually changes the second code y. Due to the gradual change of the second code y, the control signal $V_{DAC}$ changes with time. At this time, since the sample and hold circuit 270 is in the hold state, the signal $V_{SH}$ input into the driver 240 is constant.

At time $t_2$ after the completion of the gradual change of the second code y, the gain of the driver 240 changes from $g_1$ to $g_2$, and at the same time, the sample and hold circuit 270 transitions to the through state. Accordingly, the transition to the second state $\varphi_2$ is complete. After that, at time $t_3$, the sample and hold circuit 270 transitions to the tracking state and prepares for the next sampling operation.

The operation of the motor driver circuit 200A is as described above.

Application

Figure 10:
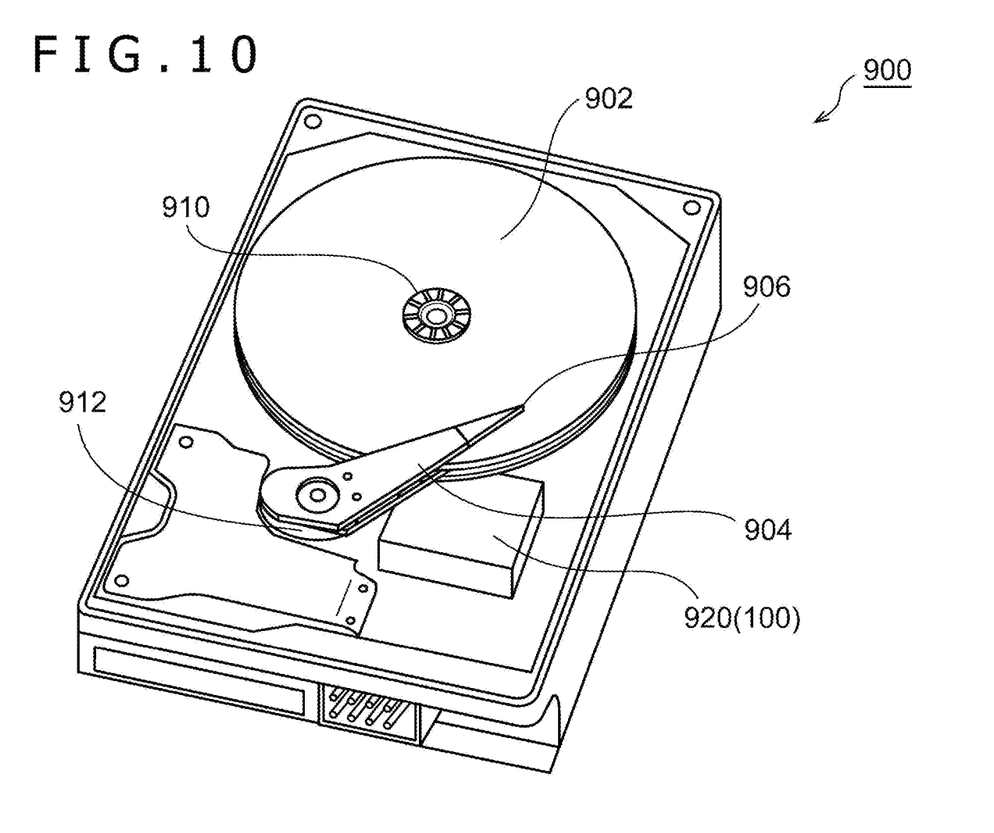
FIG. 10 is a view of a hard disk device including the motor driver circuit.

FIG. 10 is a view of a hard disk device 900, which includes the motor driver circuit 200. The hard disk device 900 includes a platter 902, a swing arm 904, a head 906, a spindle motor 910, a seek motor 912, and a motor driver circuit 920. The motor driver circuit 920 drives the spindle motor 910 and the seek motor 912.

The seek motor 912 is a voice coil motor. The motor driver circuit 200 (or 200A) according to the embodiment of the present disclosure is built into the motor driver circuit 920 and drives the seek motor 912.

The seek motor 912 positions the head 906 through the swing arm 904. Low noise is required during hard disk read and write periods, that is, when the head 906 is positioned in a particular region. Therefore, $x_a$ and $x_b$ are defined such that (i) the motor driver circuit 200 (or 200A) enters the first state $\varphi_1$ when the seek motor 912 is at a position where the head 906 is positioned in a valid region on the platter 902 and (ii) the motor driver circuit 200 (or 200A) enters the second state $\varphi_2$ when the seek motor 912 is at a position where the head 906 is positioned in a region other than the valid region on the platter 902. With this configuration, it is possible to automatically suppress noise during read and write.

The embodiments are described above. The embodiments described above are for exemplary purposes only, and it is to be understood by those skilled in the art that various modifications can be made to combinations of the constituent components and processes of the embodiments and that such modifications also fall within the scope of the present disclosure. The following describes such modifications.

First Modification

The first state $\varphi_1$ and the second state $\varphi_2$ may be manually switchable from outside according to a command from the host controller 104.

Second Modification

When the position control data POS is changed by the host controller 104, the logic circuit 220 may instantaneously switch the value of the first code x without changing it gradually.

Third Modification

In association with the second embodiment, the configuration and operation of the sample and hold circuit 270 are not limited to those described above, and another form of a sample and hold circuit or a track hold circuit may also be used.

Fourth Modification

In the second embodiment, the logic circuit 220 gradually changes the second code y. However, the present disclosure is not limited thereto. For example, the logic circuit 220 may change the second code y stepwise or switch $a_1 \cdot x_{TH}$ and $a_2 \cdot x_{TH}$ instantaneously.

Fifth Modification

The configuration of the driver 240 is not limited to any of those illustrated in FIGS. 5 and 8. For example, the error amplifier 254 may have a positive gain. For example, the output stage 260 may be of a single-ended type, instead of a differential type.

Sixth Modification

The configuration and type of the linear motor to be driven are also not limited to any configuration and type. For example, the present disclosure can also be applied to the drive of spring-return type voice coil motors or other linear actuators.

Seventh Modification

The application of the positioning device 100 is also not limited to a hard disk device. For example, the positioning device 100 can also be applied to a positioning mechanism for a camera lens.

What is claimed is:

1. A motor driver circuit comprising:
    a logic circuit that generates a second code that changes linearly with a slope "a" with respect to a first code based on a position command for a linear motor to be driven, the logic circuit being configured to switch the slope "a";
    a digital-to-analog converter that converts the second code into an analog control signal; and
    a driver that drives the linear motor such that a current detection signal $V_{CS}$ indicating a drive current of the linear motor approaches a target value $V_{REF}$ that changes linearly with a slope "g" with respect to the control signal, the driver being configured to switch the slope "g,"
    wherein the motor driver circuit is switchable between a first state and a second state,
    in the first state, $g=g_1$ and $a=a_1$, and
    in the second state, $g=g_2$ (where $|g_2|>|g_1|$) and $a=a_2=a_1 \times (g_1/g_2)$.

2. The motor driver circuit according to claim 1, further comprising:
    a sample and hold circuit connected between the digital-to-analog converter and the driver.

3. The motor driver circuit according to claim 2,
    wherein, when a value of the first code at a time of switching from the first state to the second state is $X_{TH}$, the logic circuit gradually changes the second code from a value when $a=a_1$ to a value when $a=a_2$, and, during the gradual change of the second code, the sample and hold circuit supplies the control signal sampled before the gradual change to the driver.

4. The motor driver circuit according to claim 2,
    wherein, when a value of the first code at a time of switching from the second state to the first state is $X_{TH}$, the logic circuit gradually changes the second code from a value when $a=a_2$ to a value when $a=a_1$, and the sample and hold circuit samples the control signal before the gradual change starts, and supplies the sampled control signal to the driver during the gradual change of the second code.

5. The motor driver circuit according to claim 2,
wherein the sample and hold circuit includes
   an input node connected to the digital-to-analog converter,
   an output node connected to the driver,
   a first switch connected between the input node and the output node,
   a capacitor having one end grounded,
   a second switch connected between another end of the capacitor and the input node,
   a buffer that receives a voltage at the another end of the capacitor, and
   a third switch connected between an output of the buffer and the output node, and
the sample and hold circuit is switchable between a tracking state in which the first switch and the second switch are on and the third switch is off and a hold state in which the first switch and the second switch are off and the third switch is on.

6. The motor driver circuit according to claim 5, wherein the sample and hold circuit is further switchable to a through state in which the first switch is on and the second switch and the third switch are off.

7. The motor driver circuit according to claim 6,
wherein, in a transition period between the first state and the second state,
   the sample and hold circuit samples the control signal by transitioning from the tracking state to the through state,
   after the sample and hold circuit completes a sampling operation, the logic circuit gradually changes the second code, and,
   after completion of the gradual change of the second code, a gain of the driver changes and the sample and hold circuit transitions to the through state, and
the sample and hold circuit subsequently transitions to the tracking state.

8. The motor driver circuit according to claim 1, wherein the driver includes
   a feedback circuit that generates a voltage command signal such that the current detection signal $V_{CS}$ approaches the target value $V_{REF}$, and
   an output stage that amplifies the voltage command signal and applies the amplified voltage command signal to the linear motor.

9. The motor driver circuit according to claim 8, wherein the feedback circuit includes a current sense amplifier that generates a feedback signal that changes linearly with respect to the current detection signal $V_{CS}$ and that becomes a predetermined level $V_{CMREF}$ when $V_{CS}=0$.

10. The motor driver circuit according to claim 9, further comprising:
   a sense resistor disposed on a path of the drive current of the linear motor,
   wherein the current sense amplifier includes
      a first operational amplifier,
      a first resistor connected between an inverting input of the first operational amplifier and one end of the sense resistor,
      a second resistor connected between the inverting input of the first operational amplifier and an output of the first operational amplifier,
      a third resistor connected between a non-inverting input of the first operational amplifier and another end of the sense resistor, and
      a fourth resistor having one end that receives the predetermined level $V_{CMREF}$ and another end connected to the non-inverting input of the first operational amplifier, and
   the feedback signal corresponds to an output voltage of the first operational amplifier.

11. The motor driver circuit according to claim 9, wherein the feedback circuit further includes an error amplifier that outputs the voltage command signal such that the feedback signal approaches a target level based on the control signal.

12. The motor driver circuit according to claim 11,
wherein the error amplifier includes
   a first input node that receives the feedback signal,
   a second input node that receives the control signal,
   a second operational amplifier having an inverting input, a non-inverting input that receives the predetermined level $V_{CMREF}$, and an output,
   a fifth resistor connected between the inverting input of the second operational amplifier and the first input node, and
   a sixth resistor connected between the inverting input of the second operational amplifier and the second input node,
the voltage command signal corresponds to a voltage at the output of the second operational amplifier, and
the sixth resistor is a variable resistor.

13. The motor driver circuit according to claim 8, wherein the output stage includes
   a first amplifier that amplifies the voltage command signal without inversion, and
   a second amplifier that inverts and amplifies the voltage command signal.

14. The motor driver circuit according to claim 1, wherein the linear motor is a voice coil motor.

15. The motor driver circuit according to claim 1, wherein the motor driver circuit is integrated on a single semiconductor substrate.

16. A positioning device comprising:
   a linear motor; and
   the motor driver circuit according to claim 1, the motor driver circuit driving the linear motor.

17. A hard disk device comprising:
the positioning device according to claim 16.

* * * * *